E. E. M. SPEIDEL

July 28, 1931. CHAIN Re. 18,141

Original Filed March 6, 1930

INVENTOR.
Edwin F. M. Speidel
BY Barlow & Barlow
ATTORNEYS.

Reissued July 28, 1931 Re. 18,141

UNITED STATES PATENT OFFICE

EDWIN F. M. SPEIDEL, OF CRANSTON, RHODE ISLAND

CHAIN

Original No. 1,788,552, dated January 13, 1931, Serial No. 433,733, filed March 6, 1930. Application for reissue filed March 26, 1931. Serial No. 525,579.

This invention relates to a chain of the type used for bracelets, watch straps and the like; and has for an object to provide a practical and advantageous construction, each of the links of which is identical, with parts of one link directly connecting with parts of the next link.

A further object of the invention is to provide a construction which may be of plated stock with its inner and outer exposed portions covered with the plate of the stock to enhance and cause it to maintain its appearance.

A further object of the invention is to provide the bracelet of open work construction, which may be formed by bending and swaging the metal into the desired shape.

With these and other objects and advantageous features in view, the invention consists of a novel arrangement of parts more fully disclosed in the detailed description following, in conjunction with the accompanying drawings, and more particularly set forth in the appended claims.

Figure 8:
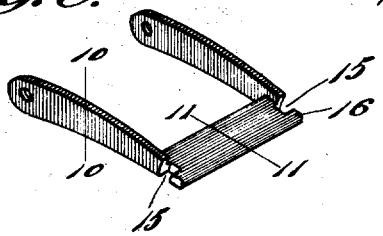
Fig. 8 is a perspective view showing the body or cross piece between the arms as notched.
Figure 10:
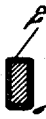
Figure 11:
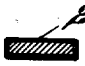

Figs. 10 and 11 are sections on the lines 10—10 and 11—11 respectively of Figure 8, showing the stock as of a plated construction.

It is found desirable to form a bracelet chain of such construction as to leave openings therethrough to permit the flesh to be exposed through the bracelet when worn upon the arm; and one method of providing such a construction which will be thin and comfortable upon the wrist and one which may have a plated surface on its exposed parts, I have bent a piece of plated wire into U-shape, displaced the stock by flattening the cross piece between the U arms and have then suitably notched this flattened portion to provide a recess into which the ends of the arms of the next link may rest, thereby forming these arms in parallel relation. The ends of the arms of each link are given aligned pivotal connections within these notches as shown in the drawings by studs fitting within recesses, and the studs may be formed upon the flattened portions by leaving sufficient metal when the notch is cut away. The following is a detailed description of the present embodiment of this invention illustrating a preferred means by which these advantageous results may be accomplished.

Figure 1:
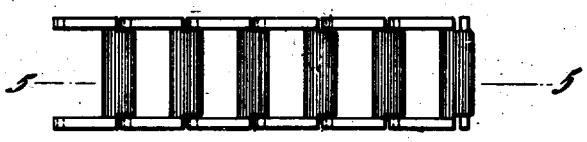
Fig. 1 is a top plan view of a portion of the chain.
Figure 2:
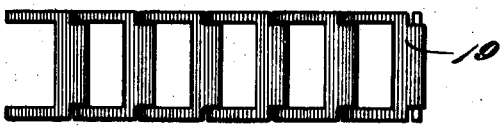
Fig. 2 is a bottom view thereof.
Figure 9:
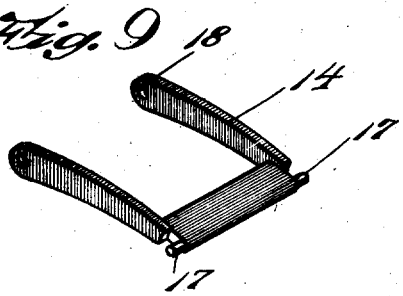
Fig. 9 is a perspective view showing the studs or trunnions as formed thereon as being rounded and the holes pierced in the arms.
Figure 6:
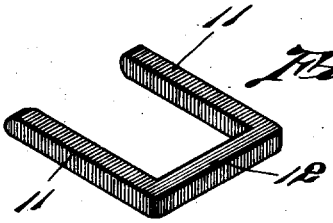
Figure 6 is a perspective view of one of the links bent into U-form.
Figure 7:
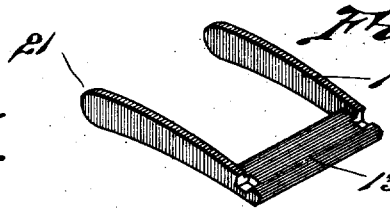
Fig. 7 is a perspective view illustrating a further operation of flattening the cross piece between the arms.

With reference to the drawings, Figure 6 illustrates a piece of wire folded into U-shape with arms 11 and a cross piece or bar 12. The bar 12 is flattened by swaging, as illustrated at 13, and at the same time the arms 14 are tapered, as shown in Figure 7. Notches 15 are cut in the body to leave studs 16 which are suitably rounded as at 17, to be received in openings 18 adjacent the ends of the tapered arms 14, as illustrated in Figure 9, whereby a chain is formed as illustrated in Figures 1 and 2. Although excellent results are attained in this manner, nevertheless it is to be understod that the broader features of this invention are not limited to these details.

Figure 3:
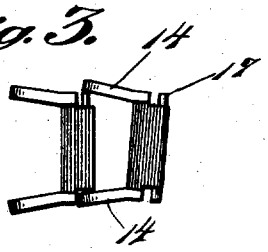
Fig. 3 is a plan view of two links before being bent into finished position.
Figure 4:
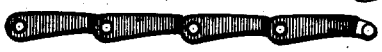
Fig. 4 is a side elevation of the chain.
Figure 5:
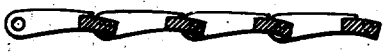
Fig. 5 is a central section on the line 5—5 of Figure 1.

In joining the links together, the arms 14 are at first diverging, as illustrated in Figure 3, which allows them to be snapped by the spring of the stock over the round pins 17, after which they are bent inwardly by suitable operations so as to be in line as illustrated in Figures 1 and 2. By using metal of such nature that it may be swaged into the desired form, there are attained not only the advantages of easy shaping, including ornamentation if desired, but also the characteristic that the metal will, while bendable as in assembling the links, nevertheless tend to retain the form into which it is bent so as to permit a dependable connection without the use of additional parts. The flattening of the cross piece 12 to form the body 13 displaces the stock from the top of the link and leaves the bottom 19 smooth, as illustrated in Figure 2, in order not to form any sharp edges or uneven surface which might be uncomfortable to the arm when worn.

From the above construction and from Figures 10 and 11, it will be observed that I have preserved the outer plated surface 20 of the wire from which the link was formed with the only parts exposed being about the notches 15, which are substantially covered by the ends 18 of the wire extending thereinto. Each of the ends is, however, suitably curved as at 21 to allow for greater flexibility of the structure.

Various appearances of the chain so constructed may be obtained by variously shaping the cross bar 12 or the arms 11 to provide a variety of effects.

While I have described certain construction forms which embody the principles of my invention, it is obvious that other desired changes in arrangement may be made within the spirit and the scope of the invention as defined in the appended claims.

I claim:

1. A bracelet chain or the like comprising a series of links, each link generally U-shaped and of a single piece of wire, the cross piece between the arms of the U being flattened to be generally in the plane of the chain and having notches cut laterally inwardly from its edge to leave studs, the opposite arms of the U having recesses to receive said studs and hingedly connect the links together.

2. A bracelet chain or the like comprising a series of links, each link generally U-shaped and of a single piece of metal, the cross piece between the arms of the U being flattened to lie substantially within the planes of the upper and lower surfaces of said arms, and having notches extending laterally inwardly from its edge to leave space for the ends of the arms of the next link, and studs and recesses on said parts adapted to hingedly connect the links together at said notches.

3. A bracelet chain or the like comprising a series of links, each link generally U-shaped and of a single piece of metal, the cross piece between the arms of the U being flattened to be generally in the plane of the chain and having notches extending laterally inwardly from its edge to leave space for the ends of the arms of the next link, and studs and recesses on said parts adapted to hingedly connect the links together at said notches, said arms being tapered from their ends toward the cross piece and being substantially longer than the extent of said cross-pieces in the direction of the length of the chain to provide substantial openings between successive cross-pieces.

4. A bracelet chain or the like comprising a series of links, each link generally U-shaped and of a single piece of metal, the cross piece between the arms of the U being flattened to be generally in the plane of the chain and having notches extending laterally inwardly from its edge to leave space for the ends of the arms of the next link, and studs and recesses on said parts adapted to hingedly connect the links together at said notches, said arms being tapered from their ends toward the cross piece and curved longitudinally to conform to the shape of the arm and being substantially longer than the extent of said cross-pieces in the direction of the length of the chain to provide substantial openings between successive cross-pieces.

5. In a bracelet chain, in combination, a plurality of links each substantially U-shaped, each including a flat body portion and spaced arms extending from said body portion lengthwise of the chain, said body portion having notches on the opposite sides thereof, and the ends of the arms of an adjoining link fitting within said notches to maintain said arms substantially parallel with respect to each other, said body portion lying substantially within the planes of the upper and lower surfaces of said arms, and means pivotally connecting the arms of one link to the body portion of an adjoining link, the wrist-contacting surfaces of said arms and of said body portion falling substantially in a single plane.

6. In a bracelet chain construction, in combination, a plurality of links, each link including a flat body portion and arms extending lengthwise of the chain and indentations in said body portion to receive the ends of the arms of the next succeeding link so that said arms are substantially parallel with each other and in substantial alignment with the arms of the next succeeding link, and a pivotal connection between the body portion of one link and the ends of the arms of a succeeding link, said body portion lying substantially within the planes of the upper and lower surfaces of said arms and the wrist-contacting surfaces of the arms and body portion of any one link falling substantially in a single plane.

7. In a bracelet chain, in combination, a plurality of links, each substantially U-shaped and including a flat cross piece extending crosswise of the bracelet chain and being substantially longer crosswise than lengthwise of the chain and two spaced bendable arms integrally formed with said cross piece and extending lengthwise of the chain, said cross piece having notches on the opposite sides thereof to receive the ends of the arms of the next succeeding link and to maintain said arms substantially parallel, thereby to form an open-work chain, and studs forming a pivotal connection between the ends of the arms of one link and the cross piece of a succeeding link, said arms being capable of being bent out of parallelism to disconnect and maintain disconnected said pivotal connection and said cross-piece lying substantially within the planes of the upper and lower surfaces of said arms.

8. In a bracelet chain, in combination, a plurality of pivotally connected substantially U-shaped links, each comprising a body portion and a pair of arms connected with the next link, said body portions being materially longer crosswise than lengthwise of the chain and being flattened to lie substantially within the planes of the upper and lower surfaces of said arms and said arms being substantially longer than the extent of said body portions in the direction of the length of the chain to provide substantial openings between successive body portions.

9. In a bracelet chain, in combination, a plurality of links, each comprising a body portion extending crosswise of the chain and a pair of substantially parallel arms pivotally connected with the body portion of the next link, each arm presenting a substantially plane-faced unbroken edge for contact with the wrist, and each of said body portions being notched to receive the free ends of the arms of the next link in a position in which they substantially lie end to end with the following arms, said body portions being flattened to lie substantially within the planes of the upper and lower edges of the corresponding arms and said arms being of such length as to space successive body portions by openings of substantial size, the wrist-contacting edges of the arms of successive links being substantially alined, thereby to present a substantially continuous bearing on the wrist.

10. In a bracelet chain, in combination, a plurality of substantially alined links each substantially U-shaped in external appearance when on the wrist and comprising a cross-piece extending crosswise of the bracelet chain and being substantially longer crosswise than lengthwise of the chain and two spaced arms integrally formed with said cross-piece and extending lengthwise of the chain for normally receiving between their free ends the cross-piece of an adjacent link, thereby to give the chain an exposed ladder-like appearance, said links being of swageable metal, and hinge means for connecting and disconnecting said links and dependent for connecting and disconnecting action upon the bend of said arms into or out of normal position and upon the retention by said arms of the bend to which they are subjected, said hinge means having coacting portions whereby one link is pivotable to either side of the plane of its adjacent link.

11. In a bracelet chain, in combination, a series of links each comprising a body portion extending crosswise of the bracelet chain and being substantially longer crosswise than lengthwise of the chain and two spaced arms extending from said body portion lengthwise of the chain, the opposite sides of said body portion having notches to receive the ends of the arms of the next succeeding link and to maintain said arms substantially parallel with the arms of the next succeeding link, thereby to form an open-work chain, and studs and recesses for receiving said studs forming a pivotal connection between the ends of the arms of one link and the body portion of the next succeeding link, said connection being disengageable by bending an arm to bring a stud out of its recess, and said notches being of sufficient expanse to cause relative swinging of the links in either direction from a flat position of the chain.

In testimony whereof, I have signed my name to this specification this 23rd day of March, 1931.

EDWIN F. M. SPEIDEL.